No. 732,822. PATENTED JULY 7, 1903.
C. S. BRADLEY.
ALTERNATING CURRENT INDUCTION MOTOR.
APPLICATION FILED OCT. 7, 1895.
NO MODEL.
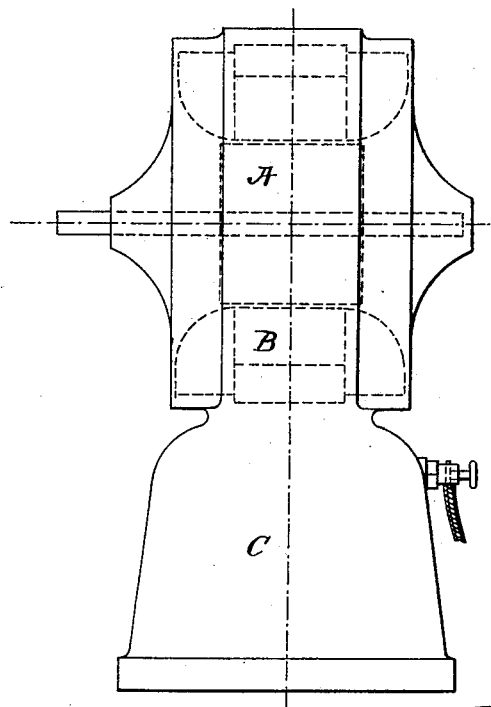
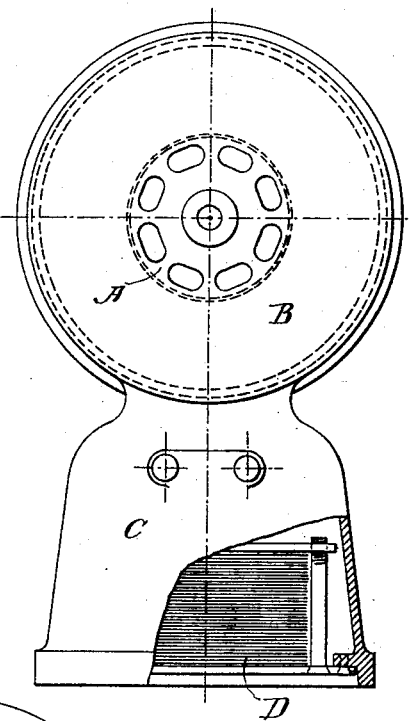
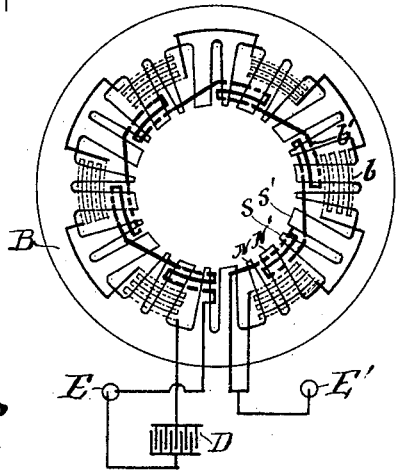

No. 732,822. Patented July 7, 1903.

UNITED STATES PATENT OFFICE.

CHARLES S. BRADLEY, OF AVON, NEW YORK, ASSIGNOR TO THE GENERAL ELECTRIC COMPANY, A CORPORATION OF NEW YORK.

ALTERNATING-CURRENT INDUCTION-MOTOR.

SPECIFICATION forming part of Letters Patent No. 732,822, dated July 7, 1903.

Application filed October 7, 1895. Serial No. 564,888. (No model.)

*To all whom it may concern:*

Be it known that I, CHARLES S. BRADLEY, a citizen of the United States, and a resident of Avon, in the county of Livingston and State of New York, have invented certain new and useful Improvements in Alternating-Current Induction-Motors, of which the following is a specification.

This invention relates to alternating-current motors, and has for its object to render such a motor self-starting upon a single-phase alternating-current circuit.

In carrying out the invention I develop from a single-phase current two currents differing in phase by the employment of a condenser and lead the phases thus produced through coils angularly displaced on an annular core. By the joint action of the two sets of coils a rotary magnetic field is developed. An induction-armature is employed— that is to say, one provided with permanently-closed circuits. After starting the reaction of the armature steadies the field, and the motor runs with a fairly uniform torque. The motor is preferably provided with a hollow base in which to store the condenser. The core in which the progressive field of force is developed is toothed, the notches being so disposed that the coils corresponding to the two current-phases overlap. The windings are arranged to produce a multipolar field, so that commercial rates of alternation may be employed, the winding which includes the condenser being of higher inductance than its companion winding to admit of the use of a comparatively small condenser to coöperate with the increased voltage in the condenser branch and to admit a better coöperation of the two windings. To accommodate the greater number of turns in the winding which includes the condenser, the slots in the core designed to accommodate it are made of greater capacity than the slots for the companion winding.

The several features of novelty of the invention will be more particularly hereinafter described, and will be definitely indicated in the claims appended to this specification.

In the accompanying drawings, which illustrate the invention, Figures 1 and 2 are respectively side and front elevations of a motor embodying my invention, the latter being partly broken away to show the place of storage of a condenser; and Fig. 3 is a diagram of the two motor-windings.

A represents the armature or secondary member of the induction-motor, and B the field-magnet or primary member. Both are built up of laminæ of sheet-iron, as usual in alternating-motor construction. The field-magnet is mounted upon a hollow frame C, forming the base, in which is stored a condenser D of any approved construction. The armature is provided with a closed-circuit winding and may be of the "squirrel-cage" or wire-wound type, as desired. The field-magnet is formed of punchings in which interiorly-projecting teeth are formed, as seen in Fig. 3. Fig. 3 exemplifies a twelve-pole motor. As shown therein, there are two teeth to each pole, so arranged that two wide slots are formed at the respective sides of each pole and a narrow slot between the two teeth of each pole, thus giving the teeth different pole-face areas proportional to the difference of phase of the operating-currents. By making the pole-faces of the teeth of different area and placing the several coils in the branch circuits of different phase, so as to overlap and include teeth of differing area, a better rotary magnetic field is produced, with phases having a smaller angular distance than ninety degrees, the rotary field being more truly circular and less elliptical and a better result in the action of the motor being produced. In the wide slots are wound or placed fine-wire coils of a much greater number of turns than the companion winding, so that it will have a high inductance compared with the fewer turns of coarser wire in the smaller slots. By this method the coils overlap, so as to afford the required difference in position to produce a shifting magnetic field, and a sufficient amount of wire may be used in the condenser branch in which the voltage is raised by the greater capacity. For example, N N' and S S' represent an adjacent pair of poles. In the large slots between the composite poles N N' and S S' are placed coils of fine wire connected in series relation to the condenser D. In the small slots are placed coils of lower resistance.

E E' represent the terminals of the motor. The phase of current in the branch of greater capacity is in advance of that of the companion branch by an amount depending on the relation of the capacity and inductance, and the two phases acting at an angle in the coils $b$ $b'$ cause a resultant pole, which shifts as the current varies and develops a rotary magnetic field in the core B. In order to reduce the size of the condenser necessary to produce the desired phase difference as small as practicable, a much greater inductance is given the coils in the condenser branch, and the value of the inductance in henries is large in the condenser branch comparable to the capacity of the latter branch in microfarads, since the greater the inductance of a circuit the smaller is the capacity required to produce resonance with its accompanying increase of voltage and current. Therefore by making the inductance high I may employ very small condensers and still obtain the desired phase difference to set up a progressively-shifting field.

As an example of a construction which may be advantageously used in practice I may state that for a one-tenth horse-power motor on a single-phase alternating-current circuit of one hundred and forty cycles per second the condenser should be sixty-five hundredths of a microfarad in capacity, the coils which are in series with it being of No. 30 copper wire having three thousand six hundred turns total, the companion coils being of No. 22 copper wire and having ten hundred and twenty turns total, the inductance of the condenser branch being approximately 12.96 times that of the other branch.

Having thus described my invention, what I claim as new, and desire to secure by Letters Patent, is—

1. An alternating-current motor having two windings in parallel relation, a condenser cooperating with one winding to increase its capacity, said winding having a greater number of turns than its companion winding, and a slotted core provided with overlapping coils corresponding to the two windings.

2. An alternating-current motor having two windings of differing inductance and capacity to produce a difference in phase of current under an applied alternating electromotive force, and a core provided with two series of relatively displaced slots to receive the windings, one series of slots being larger than the other to accommodate more wire.

3. A rotary-field electric motor provided with two windings of different inductance and capacity to produce a difference of phase under a single-phase electromotive force, said windings being wound on core-teeth to overlap and include several teeth of different pole-face area.

4. A rotary-field induction-motor provided with two windings for currents of displaced phase, said windings being placed on core-teeth, the companion coils threading groups of teeth, part of which are common to both coils, said coils being relatively displaced circumferentially to produce a rotary magnetic field.

In testimony whereof I have hereunto subscribed my name this 26th day of August, A. D. 1895.

CHARLES S. BRADLEY.

Witnesses:
 WM. V. HEAPHY,
 ROBERT J. MCNALLY.